(12) United States Patent
Weh et al.

(10) Patent No.: US 9,446,338 B2
(45) Date of Patent: Sep. 20, 2016

(54) FILTER PART FOR FLUID LINES

(71) Applicants: Erwin Weh, Illertissen (DE); Wolfgang Weh, Illertissen (DE)

(72) Inventors: Erwin Weh, Illertissen (DE); Wolfgang Weh, Illertissen (DE)

( * ) Notice: Subject to any disclaimer, the term of this patent is extended or adjusted under 35 U.S.C. 154(b) by 50 days.

(21) Appl. No.: 14/277,474

(22) Filed: May 14, 2014

(65) Prior Publication Data
US 2014/0245707 A1    Sep. 4, 2014

Related U.S. Application Data (63) Continuation of application No. PCT/EP2012/004692, filed on Nov. 9, 2012.

(30) Foreign Application Priority Data

Nov. 14, 2011 (DE) .......... 10 2011 118 632

(51) Int. Cl.
| | |
|---|---|
| *B01D 46/00* | (2006.01) |
| *B01D 39/10* | (2006.01) |
| *B01D 35/02* | (2006.01) |
| *B01D 29/15* | (2006.01) |

(52) U.S. Cl.
CPC ............... *B01D 39/10* (2013.01); *B01D 29/15* (2013.01); *B01D 35/023* (2013.01); *B01D 46/0012* (2013.01); *B01D 46/0017* (2013.01); *B01D 46/0023* (2013.01); *Y02E 60/321* (2013.01); *Y10T 29/49826* (2015.01)

(58) Field of Classification Search
CPC ....... B01D 46/02; B01D 46/10; B01D 46/23
USPC .................. 55/485, 495; 210/352, 449
See application file for complete search history.

(56) References Cited

U.S. PATENT DOCUMENTS

| 1,644,121 A | 10/1927 | Greene | |
|---|---|---|---|
| 2,068,858 A | 1/1937 | Jones | |
| 4,442,003 A * | 4/1984 | Holt ................. | B01D 35/02 210/445 |
| 5,074,381 A | 12/1991 | Minard et al. | |
| 5,259,643 A * | 11/1993 | Kraft ................ | B60R 21/2644 102/531 |
| 5,922,291 A | 7/1999 | Hanfling et al. | |
| 2004/0011726 A1* | 1/2004 | Weh ................. | G01D 29/15 210/352 |

FOREIGN PATENT DOCUMENTS

| DE | 10161388 | 7/2003 |
|---|---|---|
| WO | WO-02/00322 | 1/2002 |
| WO | WO-2009/015900 | 2/2009 |
| WO | WO-2013/072032 | 5/2013 |

* cited by examiner

*Primary Examiner* — Robert Clemente
*Assistant Examiner* — Karla Hawkins
(74) *Attorney, Agent, or Firm* — Pitts & Lake, P.C.

(57) ABSTRACT

A filter part for fluid lines, preferably high-pressure lines with pressures in the range of 150 to 900 bar, preferably in the range of 200 to 350 bar, more preferably in the range of 700 to 875 bar, for use especially in filling nipples, non-return valves, pressure regulators, cylinder valves, filling couplings, switching valves, break-off safety devices, quick couplings and also as a separate filter part. The filter part comprises a base body and at least one fluid passage opening, wherein the base body and the fluid passage opening are covered by at least one filter element. The invention further relates to a method for producing a filter part with a base body and a filter element, especially in form of a screen filter which is also known as a filter mesh.

18 Claims, 2 Drawing Sheets

FILTER PART FOR FLUID LINES

CROSS-REFERENCE TO RELATED APPLICATIONS

This Application is a continuation of PCT/EP2012/004692 filed on Nov. 9, 2012, which claims the benefit of DE 10 2011 118 632.1, filed Nov. 14, 2011, which content is incorporated herein by reference.

STATEMENT REGARDING FEDERALLY SPONSORED RESEARCH OR DEVELOPMENT

Not Applicable.

BACKGROUND OF THE INVENTION

1. Field of Invention

The invention relates to a filter part for fluid lines, for use especially in filling nipples, non-return valves, pressure regulators, cylinder valves, filling couplings, switching valves, break-off safety devices, quick couplings and also as a separate filter part.

2. Description of the Related Art

The invention relates to a filter part for fluid lines, preferably high-pressure lines with pressures in the range of 150 to 900 bar, preferably in the range of 200 to 350 bar, more preferably in the range of 700 to 875 bar, for use especially in filling nipples, non-return valves, pressure regulators, cylinder valves, filling couplings, switching valves, break-off safety devices, quick couplings and also as a separate filter part. The filter part comprises a base body and at least one fluid passage opening, wherein the base body and the fluid passage opening are covered by at least one filter element. The invention further relates to a method for producing a filter part with a base body and a filter element, especially in form of a screen filter which is also known as a filter mesh.

A filter part, especially for use in filling nipples, comprising a base body and at least one fluid passage opening covered by a filter element, is known from WO 02/00322 A1. The filter element is provided by a narrowly wound spring wire in a filter parts according to WO 02/00322 A1. The filter part known from WO 02/00322 A1 is to provide a substantially simple and strong filter part for fluid lines which is suitable for use in filling nipples for fluids, especially gaseous media and natural gas in particular, with a filling pressure of 200 bar. In particular, WO 02/00322 A1 intends to avoid the disadvantages of filter parts in which the filter elements are arranged as a braided fabric or a metal braiding, where the filter elements are perforated plates or sintered bodies of defined porosity. WO 02/00322 A1 describes the use of filter elements, especially metal fabrics and metal braiding, as disadvantageous for the use in filling nipples with filling pressures of up to 875 bar and more, since they are sensitive to compressive loading or alternating loads which can lead to material fatigue. The filter part known from WO 02/00322 A1 is designed for use with filling pressures of 200 bar substantially for natural gas, but only within limits for high pressures in the range of 700 to 875 bar, which is necessary for use of hydrogen in combination with very high filter fineness.

A valve which is controllable by means of a pressure of a fluid is known from DE 1016138 A1, in which a filter fabric not designated in closer detail is provided in front of the conical closing body.

U.S. Pat. No. 5,922,291 shows a reformer with a particle filter, wherein the particle filter is inserted into the reformate gas feed line and is arranged to be removable. This filter is configured in such a way that it is capable of retaining very fine dust particles which are carried by the reformate gas flow. A filter fabric is provided on the gas outlet which is arranged as a non-woven fibre material.

An apparatus for removing substances from oil is known from U.S. Pat. No. 5,074,381. The aperture comprises a polyester mesh as the filter screen, with openings of approximately 105 µm, so that particles with a size >0.0127 cm are retained, while the oil is pressed through the polyester mesh.

U.S. Pat. No. 4,442,003 shows a filter arrangement which is used especially for the use of liquid dye supply systems. The filter arrangement is used to keep foreign particles away from the spray nozzle. The filter according to U.S. Pat. No. 4,442,003 comprises an exchangeable filter which is arranged as a filter screen. U.S. Pat. No. 4,442,003 does not provide information on the filter mesh width and the filter configuration.

U.S. Pat. No. 2,068,858 discloses a filter nipple which is introduced into a gas line, in which the high-pressure gas is supplied to the gas consumer. The filter known from U.S. Pat. No. 2,068,858 comprises a screen with a different shape and a different mesh width. U.S. Pat. No. 2,068,858 does not provide any information on the gas pressure and the mesh width.

U.S. Pat. No. 1,644,121 shows a screen which is preferably used in a pump, especially a centrifugal pump.

None of the aforementioned citations discloses how a filter device for high pressures of up to 900 bar and more can be designed which is suitable for use with hydrogen and simultaneously offers a very high filter fineness.

BRIEF SUMMARY OF THE INVENTION

It is therefore the object of the invention to avoid the disadvantages according to the state of the art, and to provide a filter part for fluid lines in particular which offers the largest possible filter area over the smallest possible overall size, while simultaneously ensuring the optimal flow rate with the defined particle filter rate and minimal pressure loss. The filter area is thus optimised for the required gas flow rate.

This object is achieved in accordance with the invention by a filter part for fluid lines for pressures in the range of 150 to 900 bar, especially in the range of 200 to 350 bar, more preferably in the range of 700 to 875 bar, preferably for use in filling nipples, non-return valves, pressure controllers, cylinder valves, filling couplings, switching valves, break-off safety devices, quick couplings and also as a separate filter part, wherein the filter part comprises as follows: a base body and at least one fluid passage opening, wherein the base body and the fluid opening are covered at least partly by a filter part, wherein the filter element comprises at least one filter screen, which is also known as a filter mesh, with a filter layer, and the mesh width of the filter layer preferably lies in the range of 0.1 µm to 400 µm, especially 2 µm to 100 µm, preferably 2 µm to 40 µm. The base body of the filter part in accordance with the invention is used as a substructure and is provided with a supporting function with respect to the filter screen, which is preferably a metal fabric. This ensures that the filter part can absorb pressures surges and loads. The filter part in accordance with the invention is thus especially suitable both for pressures in the range of 200 bar to 350 bar as occurs in the case of natural gas, and also in the range of 700 bar to 875 bar as occurs in the case of hydrogen. As a result of the configuration in accordance with the invention with base body and a filter mesh or filter net arranged above said base body, resistance is provided against pressure surges and alternating loads, even in the case of high pressures in the range of 700 to 875 bar, i.e. in the pressure range as occurs in the case of hydrogen. Pressures up to 900 bar and more are possible.

A further advantage of the arrangement in accordance with the invention is the ability to use the system in a wide temperature range of −40° C. to 120° C., preferably −40° C. to 85° C.

The filter component in accordance with the invention is further characterized by high filter fineness in combination with compact design, very good pressure resistance and high flow rates. In particular, there is resistance against differential pressures and puncturing of up to 900 bar.

In an especially preferred embodiment, the filter screen with the base body is not detachably connected, especially by a welded connection.

As a result of this material connection, especially good retaining is produced between the base body and the filter element in order to withstand alternating loads and pressure surges of up to 900 bar.

It is especially preferred if the filter screen or filter mesh comprises at least two filter layers which are arranged one on top of the other, especially three or more filter layers arranged on top of each other. The stacking of filter layers leads to the advantage that layers with different filter mesh widths can be arranged on top of each other, e.g. the mesh width of the filter layers decreases from the base body to the outside, or vice versa. The filter layers can also comprise different materials. The arrangement with several filter layers ensures that large particles are retained at first in the first filter layer for example, slightly smaller ones in the next layer and very small ones in the last filter layer for example. Very good filtering can thus be achieved by the multilayer configuration. It is a further advantage that in the case of a three-layer configuration the first and third layer can substantially act as a supporting fabric and the intermediate layer acts as the actual filter mesh or filter screen. The layers used as supporting fabric can have larger mesh widths than the filter mesh, e.g. mesh widths of more than 400 µm or at least larger than 100 µm. The supporting fabric is then used for preliminary filtering and increases the backflushing capability and thus further increases the operational lifespan of the filter part.

It is especially preferred if the base body of the filter part comprises a plurality of grooves which are in fluid-conducting connection with at least one central fluid line. The introduction of grooves provides fluid line channels or gas pockets. Fluid is then guided through the filter screen of filter mesh via the grooves from the filter mesh to the central fluid line. The introduction of grooves is advantageous but not mandatory in any way. It is even possible that the base body does not comprise any grooves without departing from the invention.

It is especially preferred if the grooves have an ascending gradient which preferably lies in the range of 0.2 to 1.5 mm. Furthermore, the grooves have a depth which preferably lies in the range of 0.1 mm to 1 mm, especially 0.3 mm. The grooves are preferably arranged circumferentially on the base body and the distance of two adjacent grooves from each other preferably lies in the region of 0.2 mm to 1.5 mm.

It is especially preferred if the grooves open via a collecting device, preferably a so-called fluid pocket, into the central fluid line. Such a collecting device is preferably arranged at several locations of the base body, preferably on opposite sides, in order to achieve high flow rates. Although a flow rate can be achieved without fluid pockets, the flow rate is significantly increased by said fluid pockets.

The base body has a shape, especially a conical or a trapezoidal or a cylindrical shape. A conical shape is especially preferred on which the grooves progress spirally.

Materials which are H2-resistant are preferably used as materials for the base body and also for the individual filter layers, e.g. special stainless steels, especially such stainless steels with a high nickel fraction of approximately 12.5 to 17% by weight, preferably the steel 1.4404, 1.4435, 1.4306, 1.4401. Alternative materials are brass and aluminium. The mentioned materials do not represent any limitation.

In addition to the filter part, the invention also provides a method for producing such a filter part. A base body and a filter element are provided at first in a first step. The base body and the filter element are then machined and joined in a last method step into the filter part in accordance with the invention. The base body is machined at first with a plurality of grooves and/or at least one central fluid line and/or at least one collecting device by means of a metal-cutting production method, especially machining by turning, milling and drilling or by non-cutting forming such as pressing and casting. The final processing step of the base body is deburring, especially by brushing, sandblasting, grinding, explosive deburring, thermal deburring, chemical deburring, vapour honing. After the processing of the base body, the filter element is arranged in the region of the grooves above the base body and is especially connected to the base body by welding for example, especially by resistance welding. The filter element per se can consist of several filter layers. If this is the case, the individual filter layers are connected to each other prior to the attachment of the filter element to the base body, especially by welding or sintering. The filter part in accordance with the invention is preferably used in fluid lines. In particular, such filter parts can be used in valve components as described in WO 2009/015900 A1, whose scope of disclosure is fully included in the present application. The filter part in accordance with the invention replaces in WO 2009/015900 A1 the filter insert 9 with a conical external shape which is not specified in WO 2009/015900 A1, or is a filter insert according to WO 02/00322 A1.

In particular the line or the supply hose, respectively, is also to allow a reliable conduction of gaseous media such as natural gas or hydrogen at very high pressures of greater than 150 bar, in particular greater than 200 bar, preferably greater than 400 bar, in particular in the range of 150 bar to 400 bar, preferably 200 bar to 350 bar, in particular 200 bar to 250 bar. Furthermore, it is also to be durable during refueling at low temperatures in the range of −50° C. to +120° C., preferably −40° C. to +85° C. Further requirements are low weight, small dimensions, and easy handling capability. In particular, the line is to allow a refueling device having simple construction, which can be operated by customers similarly to conventional refueling devices for liquid fuels.

BRIEF DESCRIPTION OF THE SEVERAL VIEWS OF THE DRAWINGS

The invention is to be explained and described in greater detail hereafter by reference to illustrated example embodiments on the basis of the figures, without restriction thereto.

In the figures:

FIGS. 1a-1b: show an embodiment of a line according to the invention in the form of a hose having internal gas recirculation line and external high-pressure line.

DETAILED DESCRIPTION OF THE INVENTION

The invention relates to a filter part for fluid lines, preferably high-pressure lines with pressures in the range of 150 to 900 bar, preferably in the range of 200 to 350 bar, more preferably in the range of 700 to 875 bar, for use especially in filling nipples, non-return valves, pressure regulators, cylinder valves, filling couplings, switching valves, break-off safety devices, quick couplings and also as a separate filter part. The filter part comprises a base body and at least one fluid passage opening, wherein the base body and the fluid passage opening are covered by at least one filter element. The invention further relates to a method for producing a filter part with a base body and a filter element, especially in form of a screen filter which is also known as a filter mesh.

Figures 1A, 1B, 3:
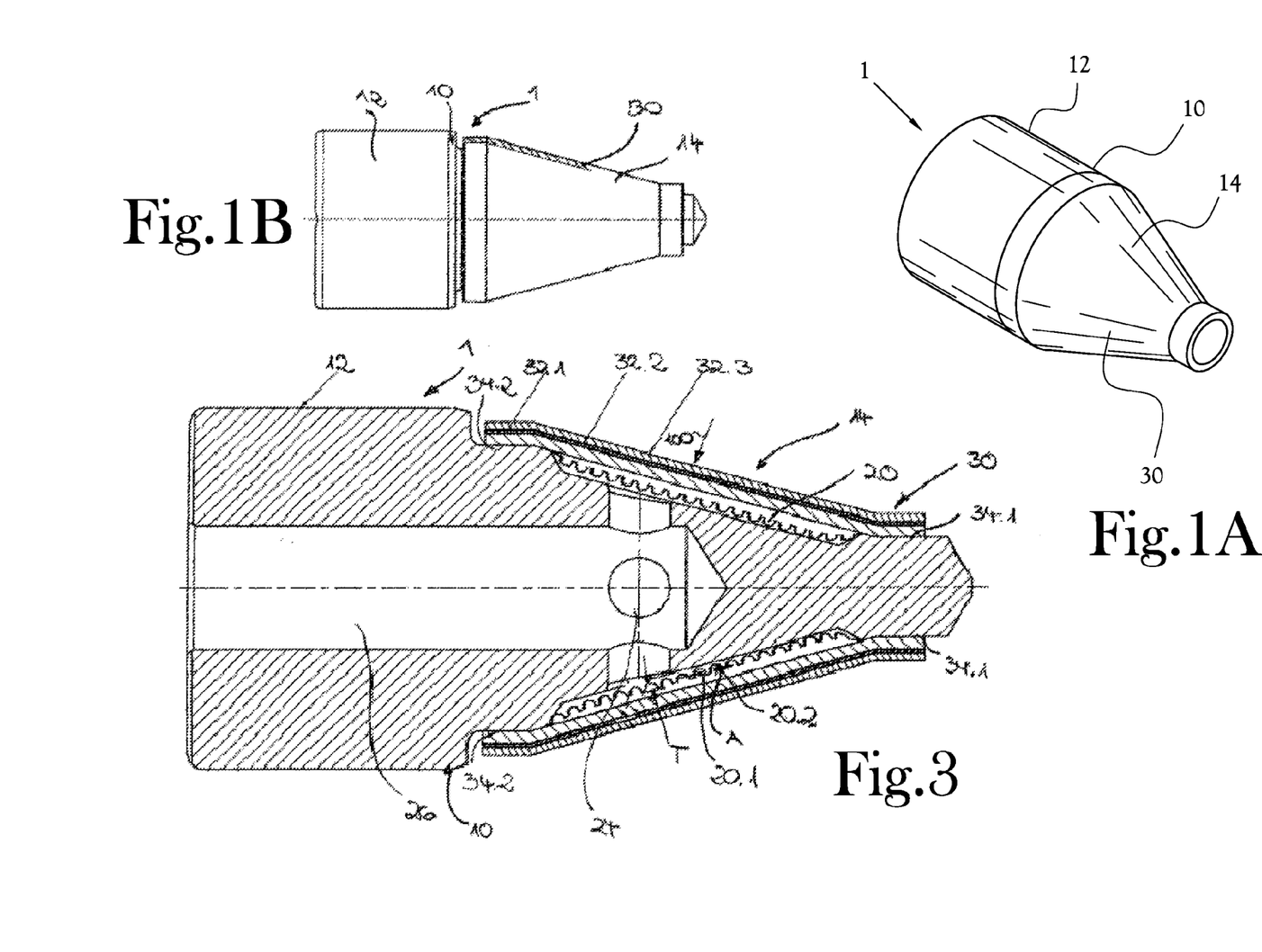
FIGS. 1*a*-1*b* show a base body with a filter mesh or filter screen arranged thereon.
FIG. 3 shows a sectional view through a base body with a filter mesh or filter screen arranged thereon.

FIGS. 1a-1b shows a base body 10 with a filter mesh or filter screen 30 arranged thereon, thus producing the filter part 1. FIG. 3 shows a sectional view of the filter part 1 for a fluid line, preferably a high-pressure line, especially for pressures in the range of 150 to 900 bar, especially in the range of 200 to 350 bar, preferably in the range of 700 to 875 bar. The filter part 1, which is shown in its entirety in FIG. 3 in a sectional view, can be inserted into a filling nipple (not shown) for example. The use of such a filter insert in a valve component in form of a connection nipple or filling nipple is shown in WO 2009/015900 A1, whose scope of disclosure is fully included in the present application. Other applications in a non-return valve, pressure controller, cylinder valve, filling coupling, switching valve, break-off safety device, quick coupling and as a separate filter part are possible and are included in the disclosure without making express reference thereto.

The base body 10 of the filter part 1 comprises two sections, i.e. a first section 12 which has a substantially cylindrical shape and a second section 14 with a conical or conically tapering exterior shape. As described in WO 2009/015900 A1 for example, the substantially cylindrical section is integrally attached in direct connection to a sealing sleeve which is held in the interior of a connection nipple according to WO 2009/015900, whose scope of disclosure is fully included in the present invention, whereas the conical section extends close to a sealing ring in the valve component according to WO 2009/015900 A1. As is described in WO 2009/015900 A1, this provides a pressure-tight connection. The filter mesh or filter screen 30 is always arranged in the present embodiment above the front (i.e. the second) conical section 14.

A side view of the base body is shown in FIG. 1b. The same components as in FIG. 1a are provided with the same reference numerals, wherein a section of the filter mesh or filter screen 30 is shown in particular.

Figure 2A:
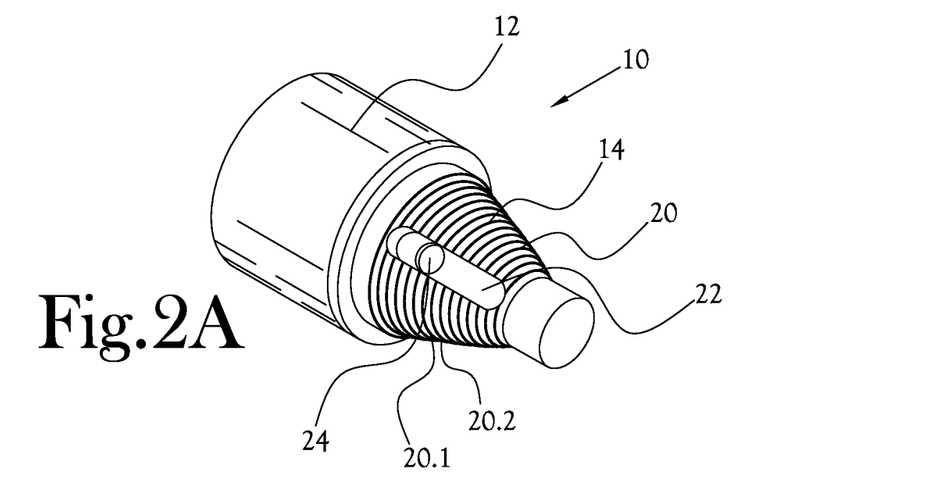
FIGS. 2a-2c show a base body after machining with introduced grooves and introduced fluid line gas pocket.
Figure 2B:
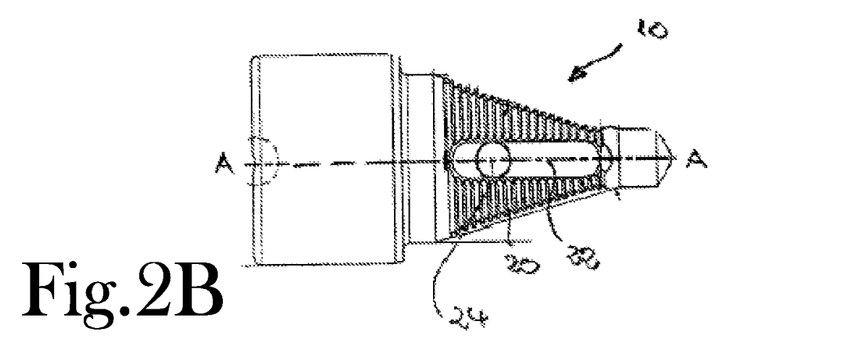

FIGS. 2a to 2b show the base body after the introduction of the grooves and before the connection of the filter element in form of a filter screen with the base body provided with the grooves.

The same components as in FIGS. 1a to 1b and FIG. 3 are provided with the same reference numerals.

It is clearly shown that the conical part 14 of the base body comprises the grooves, the gas pockets and the fluid line(s). They are introduced especially by metal-cutting methods such as machining by turning, milling and drilling, or by non-cutting forming such as pressing and casting. After the introduction of the grooves, gas pockets and fluid line, the last machining step for the base body is deburring, especially by brushing, sandblasting, grinding, explosive deburring, thermal deburring, vapour honing.

The individual grooves have a certain depth T, which lies preferably in the range of 0.1 mm to 1 mm, especially 0.3 mm to 0.4 mm.

The distance A of two adjacent circumferential grooves 20.1, 20.2 is 0.2 mm to 1.5 mm, and the ascending gradient of the grooves lies in the range of 0.2 mm to 1.5 mm, especially in the range of 0.5 mm to 0.6 m.

All grooves 20 open into a collecting device 22 which extends in the longitudinal direction of the conical region and which is arranged in the present case as a so-called fluid pocket or gas pocket. An opening 24 is introduced in the region of the fluid pocket, which opening opens into the central fluid line. As a result of the configuration of the collecting device as fluid pockets, the flow rate of the fluid, and the gas in particular, can be increased significantly. The inflow against the filter element or filter part usually occurs from the outside, i.e. the fluid reaches the central fluid line 26 or collecting line via the filter mesh or filter screen, the grooves 20, the collecting device 22 or the fluid pocket.

A side view of the base body 10 with introduced grooves 20 is shown by FIG. 2b. The same components as in FIG. 2a are provided with the same reference numerals. The fluid pocket 22 is clearly shown, which is in fluidic connection to every single one of the grooves 20.

Figure 2C:
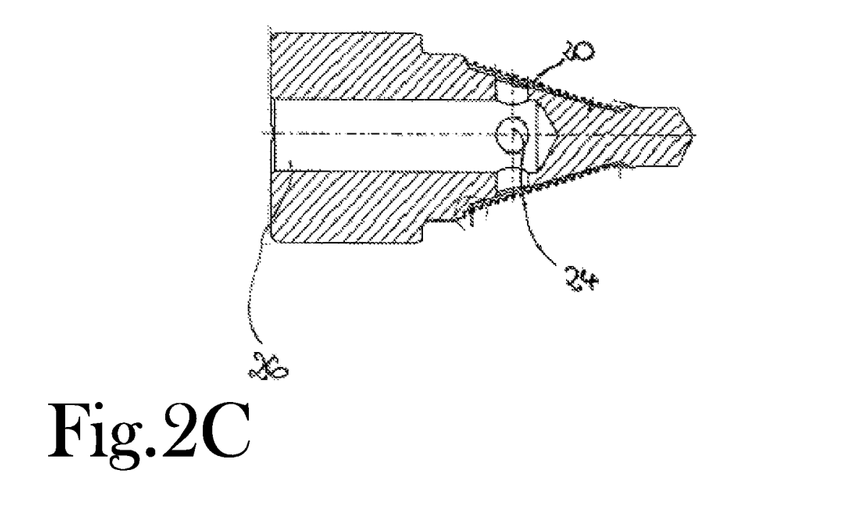

A section along the line of intersection A-A in FIG. 2b is shown in FIG. 2c. The same components are provided with the same reference numerals again. The individual grooves 20 are clearly shown, which progress around the substantially conical region of the base body, and the central fluid line 26 which opens via openings 24 into a fluid pocket 22 (in FIG. 2b) and from there into the individual circumferential grooves 20.

FIG. 3 finally shows the entire filter part 1 in accordance with the invention in a sectional view. FIG. 3 shows a base body 10 with a substantially cylindrical section 12 and a substantially conically extending section 14. FIG. 3 clearly shows the central fluid line 26, the opening 25 of the fluid line into the fluid pocket(s) not shown in FIG. 3, into which the fluid flows from each of the individual grooves 20 which were introduced into the conical part of the base body 10. The filter element 30, which is situated above the individual grooves 20 and is provided in form of a filter screen or filter mesh with a total of three filter layers 32.1, 32.2, 32.3, is shown in the present embodiment without any limitation. The configuration of the filter screen or filter mesh with three filter layers 32.1, 32.2, 32.3, as shown in FIG. 3, is merely provided by way of example. It is understood that a filter mesh or filter screen 30 with a single filter layer would also be possible. The filter mesh or filter screen 30 is produced with several filter layers prior to the application to the conical section 14 of the base body, e.g. in such a way that the three different filter layers 32.1, 32.2, 32.3 are connected to each other by welding, especially resistance welding. Other possibilities for connection can be used as an alternative to welding of the different filter layers, e.g. gluing. In one embodiment of the invention, the different filter layers 32.1, 32.2, 32.3 can have different filter mesh widths. The pressure drop at the filter mesh can be reduced in this way, because different particles are retained in each layer. It is also possible that the first filter layer 32.1 is a supporting layer, the second layer 32.2 is the filter mesh or filter screen, and the third layer 32.3 is again a supporting layer. The supporting layer can have a larger mesh width than the filter mesh or filter screen. Pre-filtering is achieved in this way and the backflushing capability is increased, leading to a longer operational lifespan. It is also possible that the individual layers have different materials.

The connection of the filter mesh or filter screen 30 with the conical section 14 of the substantially conical base body occurs in the circumferential regions 34.1, 34.2. The connection technique can again be welding, preferably resistance welding, of filter screen or filter mesh to the conical base body. Other connecting techniques such as gluing would be possible.

FIG. 3 clearly shows the depth T of the individual grooves and the distances A of adjacent grooves with respect to each other, which are measured from the middle of the one groove 20.1 to the middle of the other groove 20.2.

The flow of the gas is also shown in FIG. 3. The gas flows from the outside in the direction 100 through the filter mesh 30 into the individual grooves 22 and from there through the opening 24 into the central line 26.

In addition to welding of the different filter layers 32.1, 32.2 and 32.3, which can have different materials and/or different filter mesh widths, this can also occur by sintering.

The filter mesh widths preferably lie in the range of 0.1 µm to 400 µm, especially in the range of 2 µm to 100 µm, more preferably 2 µm to 40 µm. The filter mesh width can alternatively lie in the range of 0.1 µm to 400 µm, preferably 2 µm to 100 µm, more preferably 5 µm to 100 µm, and even more preferably 5 µm to 20 µm.

The connection of the filter mesh 30 with the conically tapering section 14 of the base body occurs after cutting the filter mesh or filter screen 32 to the geometrical shape or conical shape by resistance welding on the base body.

It is especially preferred if the filter screen or filter mesh is applied as a filter cap in one step to the base body once the filter cap has been formed from a pre-cut part, wherein the pre-cup part was welded together on a longitudinal seam.

As is clearly shown in FIG. 3, a relevant function of the base body is a supporting function in relation to the filter screen or filter mesh. In addition, the base body forms a supporting body for the sealing of the housing. An optimal flow of the gas or fluid over the entire surface of the filter screen is ensured by guiding the gas or fluid over the grooves into the fluid pocket and via the opening 24, which is arranged as a flow borehole, to the central line 26. In contrast to WO 02/00322 A1, a very large filter area is provided over a small overall with the configuration of a filter part in accordance with the invention, in which a filter screen or a filter mesh is used instead of a wound wire. Furthermore, the filter area can be optimised to the required gas flow by the multi-layer configuration, both with respect to mesh sizes and filter mesh sizes and also to the materials. Furthermore, sufficient resistance of the filter part against pressure surges and alternating loads even in the case of pressures in the range of 700 bar to 875 bar is provided by the arrangement of the filter part with base body and the filter screen or filter mesh arranged above the same. Pressures of up to 900 bar and more are possible.

A further advantage of the arrangement in accordance with the invention is the possibility for use in a wide temperature range of −40° C. to 120° C., preferably −40° C. to 85° C.

Some example embodiments of the present general inventive concept include a filter part (1) for pressures in the range of especially 150 to 900 bar, including a base body (10) and at least one fluid opening, wherein the base body (10) and the fluid opening are covered at least partly by a filter element, characterized in that the filter element is at least partly a filter screen or filter mesh (30) with at least one filter layer (32.1, 32.2, 32.3) with a mesh width especially in the range of 0.1 µm to 400 µm, preferably 2 µm to 100 µm, more preferably 2 µm to 40 µm.

Some embodiments are characterized in that the filter part is arranged for pressures in the range of 700 bar to 875 bar, wherein the base body exerts a supporting function with respect to the filter screen, such that a resistance is provided against pressure surges and/or alternating loads up to 900 bar.

Some embodiments are characterized in that the filter screen (30) is non-detachably connected to the base body (10), especially by a welded connection.

Some embodiments are characterized in that the filter screen is a metal fabric.

Some embodiments are characterized in that the filter screen or filter mesh (30) comprises at least two filter layers (32.1, 32.2, 32.3) arranged on top of each other, especially three or more filter layers arranged on top of each other.

Some embodiments are characterized in that the base body (10) comprises a plurality of grooves (20) which are in fluid-conducting connection with at least one central fluid line (26).

Some embodiments are characterized in that the grooves (20) have at least one ascending gradient, wherein the ascending gradient preferably lies in the range of 0.2 mm to 1.5 mm and/or the grooves have a depth (r), wherein the depth preferably lies in the range of 0.1 mm to 1 mm.

Some embodiments are characterized in that the grooves (20) are circumferential grooves, preferably in spiral shape, and adjacent grooves have a distance from each other, preferably in the range of 0.2 mm to 1.5 mm.

Some embodiments are characterized in that the base body (10) comprises at least one collecting device for the collection of fluid from the plurality of grooves, especially in form of a fluid pocket (22) introduced into the base body.

Some embodiments are characterized in that the base body (10) has a conical, trapezoidal or cylindrical shape, especially at least in part.

Some embodiments are characterized in that the base body (10) and/or the filter screen (30) and/or the filter layers (32.1, 32.2, 32.3) are fabricated from or include one of the following materials: an H2-resistant material; a special stainless steel, especially a special stainless steel with a high nickel fraction of preferably 12.5% by weight to 17% by weight, more preferably a special stainless steel 1.4404, 1.4435, 1.4306, 1.4401; brass; aluminium.

Some embodiments include a method for producing a filter part (1), especially according to one of the claims 1 to 11, wherein a base body and a filter element is provided, with the following steps:
- the base body (10) is provided with a plurality of grooves (20) and/or with preferably at least one central fluid line (26) and/or at least one collecting device (22) with at least;
- a metal-cutting production method, especially machining by turning, milling and drilling, or by
- non-cutting forming, especially pressing, casting;
- deburring, especially by brushing, sandblasting, grinding, explosive deburring, thermal deburring, chemical deburring;

the filter is arranged above the base body (10), preferably as a filter mesh or filter screen (30), at least over a part of the machined base body (10), especially in the region of the grooves, and is especially connected to the base body (10) preferably by welding, especially resistance welding.

Some embodiments are characterized in that the filter screen or filter mesh (30) comprises several filter layers (32.1, 32.2, 32.3), wherein the filter layers (32.1, 32.2, 32.3) are connected to each other, especially by welding or sintering.

Some embodiments are characterized in the use of a filter part according to any of the above in fluid lines, especially high-pressure lines, in filling nipples, non-return valves, pressure regulators, cylinder valves, filling couplings, switching valves, break-off safety devices, quick couplings, and also as a separate filter part.

In some example embodiments of the present general inventive concept, a filter part (1) for pressures in the range of 700 bar to 900 bar and for use with hydrogen includesa base body (10) and at least one fluid opening, wherein the base body (10) and the fluid opening are covered at least partly by a filter element, characterized in that the filter element is a filter mesh (30) with at least one filter layer (32.1, 32.2, 32.3) with a mesh width in the range of 0.1 µm to 400 µm, preferably 2 µm to 100 µm, more preferably 2 µm to 40 µm, and the base body exerts a supporting function with respect to the filter mesh, such that a resistance is provided against pressure surges and/or alternating loads up to 900 bar, wherein the filter mesh (30) is non-detachably connected to the base body (10), especially by a welded connection, wherein the base body and the individual filter layers comprise materials which are H2-resistant, especially special stainless steel, especially special stainless steels with a high nickel fraction, especially a nickel fraction in the range of 12.5% by weight to 17% by weight, or brass or aluminium.

Some embodiments are characterized in that the filter mesh (30) comprises at least two filter layers (32.1, 32.2, 32.3) arranged on top of each other, especially three or more filter layers arranged on top of each other.

Some embodiments are characterized in that the base body (10) comprises a plurality of grooves (20) which are in fluid-conducting connection with at least one central fluid line (26).

Some embodiments are characterized in that the grooves (20) have at least one ascending gradient, wherein the ascending gradient preferably lies in the range of 0.2 mm to 1.5 mm and/or the grooves have a depth (r), wherein the depth preferably lies in the range of 0.1 mm to 1 mm.

Some embodiments are characterized in that the grooves (20) are circumferential grooves, preferably in spiral shape, and adjacent grooves have a distance from each other, preferably in the range of 0.2 mm to 1.5 mm.

Some embodiments are characterized in that the base body (10) comprises at least one collecting device for the collection of fluid from the plurality of grooves, especially in form of a fluid pocket (22) introduced into the base body.

Some embodiments are characterized in that the base body (10) has a conical, trapezoidal or cylindrical shape, especially at least in part.

Some embodiments are characterized in that the base body (10) and/or the filter layers (32.1, 32.2, 32.3) consist of a special stainless steel (1.4404, 1.4435, 1.4306, 1.4401).

Some embodiments include a method for producing a filter part (1), according to any of the above, wherein a base body and a filter element are provided, with the following steps:
- the base body (10) is provided with a plurality of grooves (20) and/or preferably at least one central fluid line (26) and/or at least one collecting device (22) with at least;
- a metal-cutting production method, especially machining by turning, milling and drilling, or by
- non-cutting forming, especially pressing, casting;
- deburring, especially by brushing, sandblasting, grinding, explosive deburring, thermal deburring, chemical deburring;
- the filter element is arranged above the base body (10), at least over a part of the machined base body (10), especially in the region of the grooves, as a filter mesh (30) with at least one filter layer (32.1, 32.2, 32.3) with a mesh width in the range of 0.1 µm to 400 µm, preferably 2 µm to 100 µm, more preferably 2 µm to 40 µm, and is non-detachably connected to the base body (10) preferably by welding, especially resistance welding, wherein the base body and the individual filter layers consist of materials which are H2-resistant, especially special stainless steel, preferably special stainless steel with a high nickel fraction, especially a high nickel fraction in the range of 12.5% by weight to 17% by weight, or brass or aluminium.

In some embodiments. the filter mesh (30) comprises several filter layers (32.1, 32.2, 32.3), wherein the filter layers (32.1, 32.2, 32.3) are connected to each other, especially by welding or sintering.

Some embodiments include the use of a filter part according to one of the above, in fluid lines, especially high-pressure lines, in filling nipples, non-return valves, pressure regulators, cylinder valves, filling couplings, switching valves, break-off safety devices, quick couplings, and also as a separate filter element.

In some example embodiments of the present general inventive concept, a filter part for pressures in the range of 700 bar to 900 bar and for use with hydrogen includes a base body and at least one fluid opening, wherein the base body and the fluid opening are covered at least partly by a filter element, characterized in that the filter element is a filter mesh with at least one filter layer with a mesh width in the range of 0.1 µm to 400 µm, and the base body exerts a supporting function with respect to the filter mesh, such that a resistance is provided against pressure surges and/or alternating loads up to 900 bar, wherein the filter mesh is non-detachably connected to the base body, wherein the base body and the individual filter layers comprise materials which are H2-resistant, wherein the base body and the individual filter layers consist of materials selected from the group consisting of stainless steel, special stainless steel with a high nickel fraction, brass, and aluminium.

In some example embodiments of the present general inventive concept, a filter part for pressures in the range of 700 bar to 900 bar and for use with hydrogen includes a base body and at least one fluid opening, wherein the base body and the fluid opening are covered at least partly by a filter element, characterized in that the filter element is a filter mesh with at least one filter layer with a mesh width in the range of 0.1 µm to 400 µm, and the base body exerts a supporting function with respect to the filter mesh, such that a resistance is provided against pressure surges and/or alternating loads up to 900 bar, wherein the filter mesh is non-detachably connected to the base body, wherein the base body and the individual filter layers comprise materials which are H2-resistant, especially special stainless steel, especially special stainless steels with a high nickel fraction, especially a nickel fraction in the range of 12.5% by weight to 17% by weight, or brass or aluminium.

Some embodiments are characterized in that the filter element is a filter mesh with at least one filter layer with a mesh width in the range of 2 µm to 40 µm.

Some embodiments are characterized in that the filter mesh is non-detachably connected to the base body by a welded connection.

In some embodiments, the base body comprises a plurality of grooves which are in fluid-conducting connection with at least one central fluid line.

Some embodiments are characterized in that the filter mesh comprises at least two filter layers arranged on top of each other, especially three or more filter layers arranged on top of each other.

Some embodiments are characterized in that the filter mesh comprises at least three filter layers arranged on top of each other.

Some embodiments are characterized in that the base body comprises a plurality of grooves which are in fluid-conducting connection with at least one central fluid line.

Some embodiments are characterized in that the grooves have at least one ascending gradient, wherein the ascending gradient preferably lies in the range of 0.2 mm to 1.5 mm and/or the grooves have a depth (r), wherein the depth preferably lies in the range of 0.1 mm to 1 mm.

Some embodiments are characterized in that the ascending gradient lies in the range of 0.2 mm to 1.5 mm.

Some embodiments are characterized in that the grooves have a depth (r) in the range of 0.1 mm to 1 mm.

Some embodiments are characterized in that the grooves are circumferential grooves.

Some embodiments are characterized in that the circumferential grooves are in spiral shape.

Some embodiments are characterized in that adjacent grooves have a distance from each other in the range of 0.2 mm to 1.5 mm Some embodiments are characterized in that the base body comprises at least one collecting device for the collection of fluid from the plurality of grooves.

Some embodiments are characterized in that the at least one collecting device includes a fluid pocket introduced into the base body.

Some embodiments are characterized in that the base body has a shape that is at least in part conical, trapezoidal, or cylindrical.

Some embodiments are characterized in that the filter layers include a special stainless steel.

Some embodiments are characterized in that the filter part is used in fluid lines, filling nipples, non-return valves, pressure regulators, cylinder valves, filling couplings, switching valves, break-off safety devices, quick couplings, or as a separate filter element.

In some example embodiments of the present general inventive concept, a method for producing a filter part includes providing a base body with a plurality of grooves, with at least one central fluid line, and with at least one collecting device, providing a filter element, and arranging the filter element is arranged above the base body as a filter mesh with at least one filter layer with a mesh width in the range of 0.1 µm to 400 µm is non-detachably connected to the base body by welding, wherein the base body and the individual filter layers consist of materials which are H2-resistant, wherein the base body and the individual filter layers consist of materials selected from the group consisting of stainless steel, special stainless steel with a high nickel fraction, brass, and aluminium, wherein said base body is prepared by a process that includes at least one step selected from the group consisting of machining by turning, machining by milling, machining by drilling, forming by pressing, forming by casting, brushing, sandblasting, grinding, explosive deburring, thermal deburring, and chemical deburring.

In some embodiments, the filter mesh comprises several filter layers, wherein the filter layers are connected to each other by welding or sintering.

In some embodiments, the invention comprises aspects which are outlined in the following sentences, which are part of the description but no claims:

A filter part (1) for fluid lines, preferably high-pressure lines with pressures in the range of especially 150 to 900 bar, preferably 200 to 350 bar, more preferably 700 bar to 875 bar, for use preferably in filling nipples, non-return valves, pressure regulators, cylinder valves, filling couplings, switching valves, break-off safety devices, quick couplings and as a separate filter part, comprising a base body (10) and at least one fluid opening, wherein the base body (10) and the fluid opening are covered at least partly by a filter element, characterized in that the filter element is at least partly a filter screen or filter mesh (30) with at least one filter layer (32.1, 32.2, 32.3) with a mesh width especially in the range of 0.1 µm to 400 µm, preferably 2 µm to 100 µm, more preferably 2 µm to 40 µm.

A filter part (1) according to any of the above, characterized in that the filter screen or filter mesh (30) comprises at least two filter layers (32.1, 32.2, 32.3) arranged on top of each other, especially three or more filter layers arranged on top of each other.

A filter part according to any of the above, characterized in that the base body (10) comprises a plurality of grooves (20) which are in fluid-conducting connection with at least one central fluid line (26).

A filter part according to any of the above, characterized in that the grooves (20) have at least one ascending gradient, wherein the ascending gradient preferably lies in the range of 0.2 mm to 1.5 mm and/or the grooves have a depth (r), wherein the depth preferably lies in the range of 0.1 mm to 1 mm.

A filter part according to any of the above, characterized in that the grooves (20) are circumferential grooves, preferably in spiral shape, and adjacent grooves have a distance from each other, preferably in the range of 0.2 mm to 1.5 mm.

A filter part according to any of the above, characterized in that the base body (10) comprises at least one collecting device for the collection of fluid from the plurality of grooves, especially in form of a fluid pocket (22) introduced into the base body.

A filter part according to any of the above, characterized in that the base body (10) has a conical, trapezoidal or cylindrical shape, especially at least in part.

A filter part according to any of the above, characterized in that the base body (10) consists of one of the following materials:
  an H2-resistant material;
  a special stainless steel, especially a special stainless steel with a high nickel fraction of preferably 12.5% by weight to 17% by weight, more preferably a special stainless steel 1.4404, 1.4435, 1.4306, 1.4401;
  brass;
  aluminium.

A method for producing a filter part (1), especially according to any of the above, wherein a base body and a filter element is provided, with the following steps:

the base body (10) is provided with a plurality of grooves (20) and/or preferably at least one central fluid line (26) and/or at least one collecting device (22) with at least;

a metal-cutting production method, especially machining by turning, milling and drilling, or by non-cutting forming, especially pressing, casting;

deburring, especially by brushing, sandblasting, grinding, explosive deburring, thermal deburring, chemical deburring;

the filter is arranged above the base body (10), preferably as a filter mesh or filter screen (30), at least over a part of the machined base body (10), especially in the region of the grooves, and is especially connected to the base body (10) preferably by welding, especially resistance welding.

A method according to any of the above, characterized in that the filter screen or filter mesh (30) comprises several filter layers (32.1, 32.2, 32.3), wherein the filter layers (32.1, 32.2, 32.3) are connected to each other, especially by welding or sintering.

While the present general inventive concept has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The present general inventive concept in its broader aspects is therefore not limited to the specific details, representative apparatus and methods, and illustrative examples shown and described. Accordingly, departures may be made from such details without departing from the spirit or scope of applicant's general inventive concept.

Still other embodiments will become readily apparent to those skilled in this art from reading the above-recited detailed description in view of all the drawings. It is noted that the simplified diagrams do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A filter part for pressures in the range of 700 bar to 900 bar and for use with hydrogen, comprising:

a base body and at least one fluid opening, wherein the base body and the fluid opening are covered at least partly by a filter element, characterized in that the filter element is a filter mesh with at least one filter layer with a mesh width in the range of 0.1 µm to 400 µm, and the base body exerts a supporting function with respect to the filter mesh, such that a resistance is provided against pressure surges and/or alternating loads up to 900 bar, wherein the filter mesh is non-detachably connected to the base body by a welded connection, wherein the base body and the individual filter layers comprise materials which are H2-resistant, wherein the base body and the individual filter layers consist of materials selected from the group consisting of stainless steel, special stainless steel with a high nickel fraction, special stainless steel with a nickel fraction between 12.5% and 17% by weight, brass, and aluminium, and wherein the base body comprises a plurality of grooves which are in fluid-conducting connection with at least one central fluid line.

2. A filter part according to claim 1, characterized in that the filter element is a filter mesh with at least one filter layer with a mesh width in the range of 2 µm to 40 µm.

3. A filter part according to claim 1, characterized in that the filter mesh comprises at least two filter layers arranged on top of each other, especially three or more filter layers arranged on top of each other.

4. A filter part according to claim 3, characterized in that the filter mesh comprises at least three filter layers arranged on top of each other.

5. A filter part according to claim 3, characterized in that the base body comprises a plurality of grooves which are in fluid-conducting connection with at least one central fluid line.

6. A filter part according to claim 5, characterized in that the grooves have at least one ascending gradient, wherein the ascending gradient preferably lies in the range of 0.2 mm to 1.5 mm and/or the grooves have a depth (r), wherein the depth preferably lies in the range of 0.1 mm to 1 mm.

7. A filter part according to claim 6, wherein the ascending gradient lies in the range of 0.2 mm to 1.5 mm.

8. A filter part according to claim 6, wherein the grooves have a depth (r) in the range of 0.1 mm to 1 mm.

9. A filter part according to claim 6, characterized in that the grooves are circumferential grooves.

10. A filter part according to claim 9, characterized in that the circumferential grooves are in spiral shape.

11. A filter part according to claim 9, characterized in that adjacent grooves have a distance from each other in the range of 0.2 mm to 1.5 mm.

12. A filter part according to claim 1, characterized in that the base body comprises at least one collecting device for the collection of fluid from the plurality of grooves.

13. A filter part according to claim 12, characterized in that the at least one collecting device includes a fluid pocket introduced into the base body.

14. A filter part according to claim 1, characterized in that the base body has a shape that is at least in part conical, trapezoidal, or cylindrical.

15. A filter part according to claim 1, characterized in that the filter layers include a special stainless steel.

16. A filter part according to claim 1, characterized in that the filter part is used in fluid lines, filling nipples, non-return valves, pressure regulators, cylinder valves, filling couplings, switching valves, break-off safety devices, quick couplings, or as a separate filter element.

17. A method for producing a filter part, comprising:
providing a base body with a plurality of grooves to be in fluid-conducting connection with at least one central fluid line, and with at least one collecting device;
providing a filter element; and
arranging the filter element is arranged above the base body as a filter mesh with at least one filter layer with a mesh width in the range of 0.1 μm to 400 μm is non-detachably connected to the base body by welding, wherein the base body and the individual filter layers consist of materials which are H2-resistant, wherein the base body and the individual filter layers consist of materials selected from the group consisting of stainless steel, special stainless steel with a high nickel fraction, brass, and aluminium;
wherein said base body is prepared by a process that includes at least one step selected from the group consisting of machining by turning, machining by milling, machining by drilling, forming by pressing, forming by casting, brushing, sandblasting, grinding, explosive deburring, thermal deburring, and chemical deburring.

18. A method according to claim 17, characterized in that the filter mesh comprises several filter layers, wherein the filter layers are connected to each other by welding or sintering.

* * * * *